(12) United States Patent
Devries

(10) Patent No.: US 9,869,197 B2
(45) Date of Patent: Jan. 16, 2018

(54) ROTOR FOR A STEAM TURBINE

(71) Applicant: Siemens Aktiengesellschaft, Munich (DE)

(72) Inventor: Jorg Devries, Wesel (DE)

(73) Assignee: Siemens Aktiengesellschaft, Munich (DE)

( * ) Notice: Subject to any disclaimer, the term of this patent is extended or adjusted under 35 U.S.C. 154(b) by 481 days.

(21) Appl. No.: 14/398,463

(22) PCT Filed: Apr. 5, 2013

(86) PCT No.: PCT/EP2013/057185
§ 371 (c)(1),
(2) Date: Nov. 2, 2014

(87) PCT Pub. No.: WO2013/167328
PCT Pub. Date: Nov. 14, 2013

(65) Prior Publication Data
US 2015/0139780 A1    May 21, 2015

(30) Foreign Application Priority Data

May 7, 2012   (EP) .................................. 12166935

(51) Int. Cl.
| *F01D 3/02* | (2006.01) |
| *F01D 5/02* | (2006.01) |
| *F01D 15/12* | (2006.01) |
| *F01D 25/18* | (2006.01) |
| *F02C 3/113* | (2006.01) |

(52) U.S. Cl.
CPC ............... *F01D 15/12* (2013.01); *F01D 3/02* (2013.01); *F01D 5/02* (2013.01); *F01D 25/183* (2013.01); *F02C 3/113* (2013.01); *F05D 2260/40311* (2013.01)

(58) Field of Classification Search
CPC .......... F01D 15/12; F01D 5/02; F01D 25/183; F01D 3/02; F02B 33/44; F02B 39/04; F02B 39/12; F16J 15/54; F16J 15/3272; F02C 3/113; F05D 2260/40311
See application file for complete search history.

(56) References Cited

U.S. PATENT DOCUMENTS

| 4,251,987 A | 2/1981 | Adamson |
| 4,964,844 A | 10/1990 | Bagnall |
| 5,433,674 A | 7/1995 | Sheridan et al. |

(Continued)

FOREIGN PATENT DOCUMENTS

| CN | 1242817 A | 1/2000 |
| CN | 101649754 A | 2/2010 |

(Continued)

OTHER PUBLICATIONS

NP Notice of Allowance dated Sep. 5, 2016, for JP application No. 2015510696.

Primary Examiner — Igor Kershteyn
(74) Attorney, Agent, or Firm — Beusse Wolter Sanks & Maire

(57) ABSTRACT

A turbomachine is provided, wherein the rotor comprises a planetary gear on which low-pressure end stage blades are arranged, wherein the planetary gear is designed in such a way that the frequency of the rotating blades is lower than the frequency of the rotor.

9 Claims, 2 Drawing Sheets

(56) References Cited

U.S. PATENT DOCUMENTS

| | | | |
|---|---|---|---|
| 6,305,901 B1 | 10/2001 | Bell et al. | |
| 7,937,927 B2 * | 5/2011 | Suciu | F02C 3/073 60/268 |
| 8,104,265 B2 | 1/2012 | Kupratis | |
| 8,657,562 B2 * | 2/2014 | Burdgick | F01D 9/02 415/101 |
| 8,757,959 B2 * | 6/2014 | Suciu | F02C 3/073 415/111 |
| 2008/0022653 A1 | 1/2008 | Schilling | |
| 2009/0000265 A1 | 1/2009 | Kupratis | |
| 2009/0090096 A1 | 4/2009 | Sheridan | |
| 2012/0051833 A1 | 3/2012 | Israeli et al. | |

FOREIGN PATENT DOCUMENTS

| | | | | |
|---|---|---|---|---|
| DE | 3825528 A1 | | 3/1989 | |
| EP | 2009270 A2 | | 12/2008 | |
| GB | 712495 A | * | 7/1954 | ............ F01D 15/12 |
| JP | H04272392 A | | 9/1992 | |
| JP | H09512079 A | | 12/1997 | |
| JP | 2000247559 A | | 9/2000 | |
| JP | 2008032016 A | | 2/2008 | |
| JP | 2013032748 A | | 2/2013 | |

* cited by examiner

ROTOR FOR A STEAM TURBINE

CROSS REFERENCE TO RELATED APPLICATIONS

This application is the US National Stage of International Application No. PCT/EP2013/057185 filed Apr. 5, 2013, and claims the benefit thereof. The International Application claims the benefit of European Application No. EP12166935 filed May 7, 2012. All of the applications are incorporated by reference herein in their entirety.

FIELD OF INVENTION

The invention relates to a rotor for a turbomachine. The invention further relates to a steam turbine.

BACKGROUND OF INVENTION

Steam turbines, which are used for the local supply of power and can be considered an embodiment of a turbomachine, are relatively large and are thus accordingly heavy. Such steam turbines can weigh well over 100 tonnes. A steam turbine essentially comprises a rotatably mounted component, also referred to as a shaft. This shaft comprises rotor blades which are arranged fixed to the shaft surface. Such a shaft is rotatably mounted inside a casing, wherein the casing comprises guide vanes which, together with a rotor blade, represent a turbine stage.

In operation, the shaft of a steam turbine rotates preferably at 50 Hz or 60 Hz. Such high rotational frequencies lead to enormous centrifugal forces on the rotor blades. In particular, the end stages of a low-pressure steam turbine are accordingly large and thus experience a particularly large centrifugal force.

For technical reasons, the shafts of the steam turbines are operated at a constant rotational speed. In order to nonetheless be able to build relatively large end stages, lower-density materials—which therefore experience smaller centrifugal forces—are used. An example of such a material is titanium, which is used in some end stages. Other solutions may be possible, such that the fixed rotational frequency is reduced, e.g. a half-speed rotational frequency. It would also be possible to reduce the rotational frequency using transmission machines.

SUMMARY OF INVENTION

It is an object of the invention to propose a shaft for a turbomachine, which is suitable for relatively high frequencies.

This object is achieved with a rotor for a turbomachine having a planetary gearset comprising a crown wheel which is arranged about the rotor and is arranged in a rotationally fixed manner, wherein the crown wheel has internal teeth which interact with multiple internal planet gears, a planet disk which is arranged about the shaft and on which the planet wheels are rotatably arranged, wherein the shaft has a sun gear which interacts with the planet gears and a rotor disk having rotor blades which are arranged on the planet disk.

This thus adopts the path of changing not the frequency of the shaft but in particular the end stage comprising the rotor blades on the shaft. To that end, a planetary gearset is considered, which has the advantage that the frequency of the shaft is reduced to the frequency of the planetary disk, on which the rotor blades are arranged. This substantially reduces the centrifugal forces on the rotor blades of the end stage. The consequence of this is that, instead of the material titanium, mentioned as an example, it is possible to use another material which, although heavier, is stronger, such as steel.

As a consequence of the lower frequency at the end stage, this end stage can now be designed with larger cross sections in accordance with the physically limiting centrifugal force. By selecting low-density materials, the trailing cross section can be enlarged further, as hitherto also in solutions without a planetary gearset.

Advantageous refinements are indicated in the subclaims.

Thus, in a first advantageous refinement, the planetary gearset is sealed with respect to the shaft. According to aspects of the invention, this is effected using an oil seal between the shaft and the planet disk or the rotor disk. Equally, in an alternative embodiment of the invention, a steam seal between the shaft and the planet disk is possible. The steam flowing during operation should flow only through the flow duct and with as few losses as possible. Consequently, all possible leaks between the rotating and static components should be avoided.

In one advantageous refinement, the planetary gearset has at least four planet gears. This leads to increased stability of the shaft and leads to a lower risk of the planetary gearset failing.

According to aspects of the invention, the shaft can be used for both single-flow and double-flow steam turbines. The invention will now be explained in more detail with reference to the following exemplary embodiment.

DETAILED DESCRIPTION OF INVENTION

Figure 1:
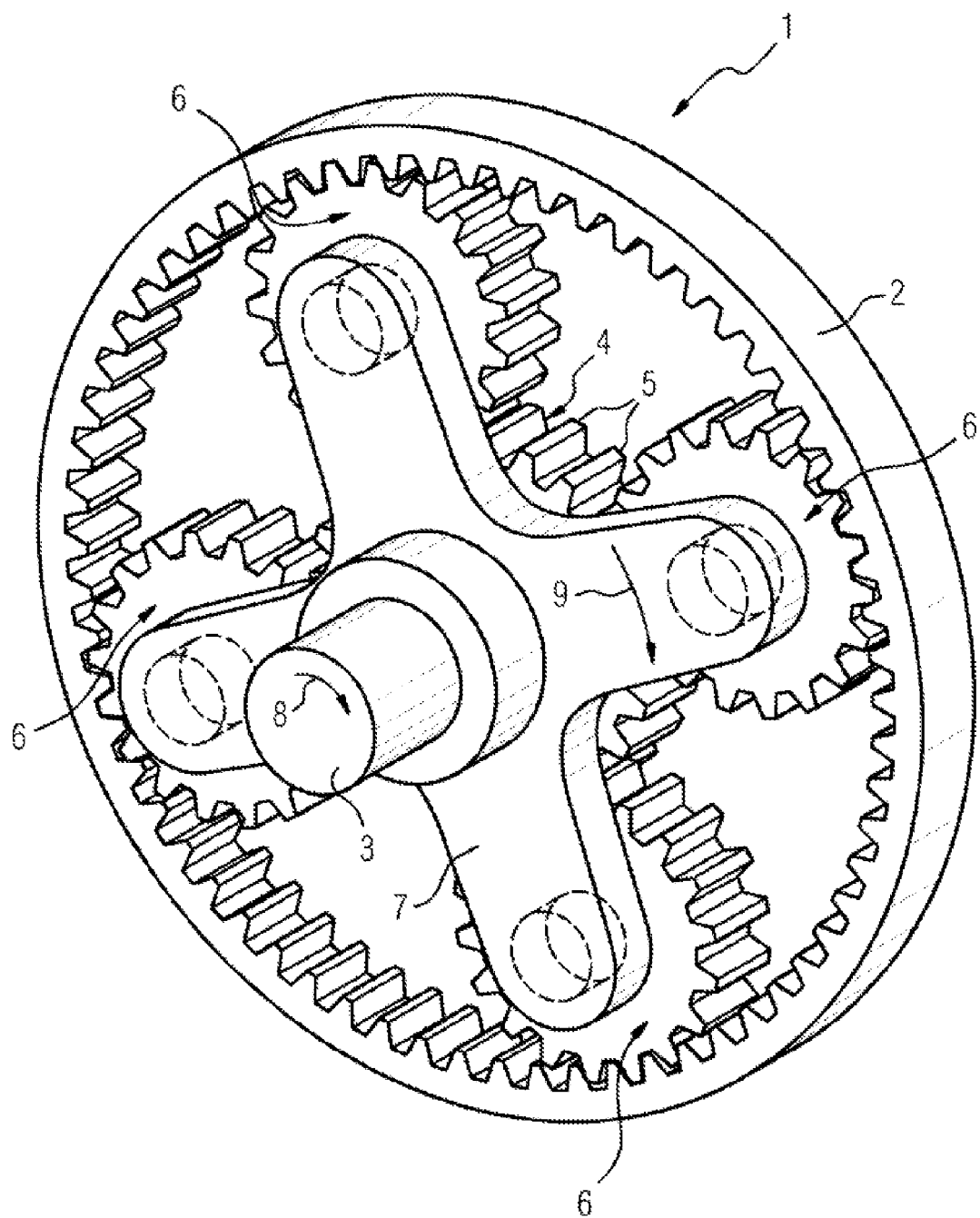
FIG. 1 shows a planetary gearset for a shaft.

FIG. 1 shows a planetary gearset 1 which comprises multiple individual components. The planetary gearset 1 comprises a crown wheel 2 which has teeth on its inner side. This crown wheel 2 has a larger diameter than the diameter of a shaft 3. The shaft 3 has a sun wheel 4 which has teeth 5 on its outer circumference. In FIG. 1, for reasons of clarity, only two teeth are provided with the reference sign 5. The teeth 5 of the sun gear 4 engage in corresponding teeth of a planet gear 6.

The planet gears 6, the crown wheel 2 and the sun gear 4 are thus arranged in one plane.

The planet gears 6 are held by a planet disk 7, such that the planet gears 6 are arranged rotatably on the planet disk 7. The crown wheel 2 is arranged in a rotationally fixed manner. In this context, the crown wheel can be rigidly connected to the casing 11.

Thus, a rotation 8 of the shaft 3 on the sun gear 4 is transmitted to the planet gear 6. The planet gear 6 thus rotates about an axis of rotation. The consequence of this is that, as a result of the planet gear 6 engaging in the toothing of the crown wheel 2, the planet disk 7 is set in motion. The planet disk 7 thus also rotates and executes a rotation 9. By selecting suitable diameters for the crown wheel 2 and the planet gears 6, it is possible to effect a marked reduction in the frequency of the planet disk 7 with respect to the frequency of the shaft 3.

In a first embodiment, the rotor blades 17 are arranged on the planet disk 7.

In an alternative embodiment, a rotor disk 16 is force-fitted onto the planet disk 7. Rotor blades 17 (not shown in FIG. 1) are arranged on the rotor disk 16. Further rotor blades 18, forming a blade stage, are arranged on the rotor and rotate with a higher frequency than the rotor blades connected to the planetary gearset. The further rotor blades 18, which are fixedly connected to the rotor, are arranged upstream, as seen in a flow direction 19 of the main flow, of the rotor blades 17 connected to the planetary gearset. For reasons of clarity, only one blade stage is shown in FIG. 2.

Figure 2:
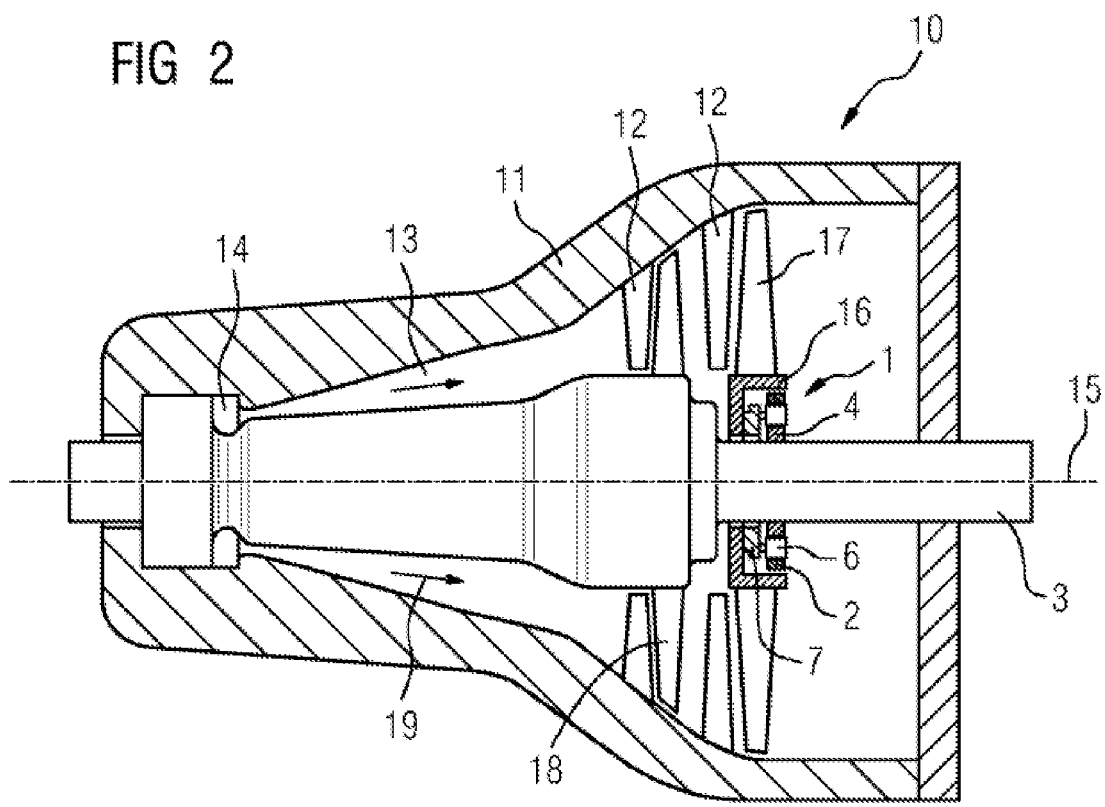
FIG. 2 shows the cross section of a steam turbine having an end stage according to the invention.

FIG. 2 shows the arrangement of the planetary gearset 1 in a turbomachine 10. The turbomachine 10, embodied as a steam turbine, has a casing 11 on the inner side of which are arranged guide vanes 12. In FIG. 2, only two guide vanes are provided with the reference sign 12. The remaining guide vanes are not shown for reasons of clarity. A flow duct 13 is formed between the shaft 3 and the casing 11, which duct is formed by various guide vanes and rotor blades (not shown). Steam, which flows into the steam turbine via an inlet opening 14, flows through this flow duct 13. The shaft 3 rotates about an axis of rotation 15. This frequency is approximately constant. By means of the planetary gearset 1, the planet disk 7 rotates at a lower frequency. A rotor disk 16 with rotor blades 17 of an end stage is arranged on the planet disk 7. These rotor blades 17 now experience a smaller centrifugal force than if the rotor blades 17 had been arranged directly on the shaft surface.

The steam turbine represented in FIG. 2 is a single-flow steam turbine. This means that the steam, which enters the flow duct 13 via the inflow opening 14, flows only in one direction. The invention can equally be used in double-flow steam turbines. This means that the steam enters a steam turbine via an inflow opening and thence flows further in each of two flow channels which exhibit flow directions 180° apart. In such double-flow steam turbines, two planetary gearsets 1 can be used, in order to configure each of the end stages according to the invention. This means that the frequency of the end stages of the double-flow steam turbine is configured such that, with respect to identical end stages without a planetary gearset, the centrifugal forces are lower as a result of the lower frequency.

The invention claimed is:

1. A rotor for a turbomachine having a planetary gearset comprising
    a shaft and a crown wheel which is arranged about the shaft and adapted to be arranged in a rotationally fixed manner,
    wherein the crown wheel has internal teeth which interact with multiple internal planet gears,
    a planet disk which is arranged about the shaft and on which the planet gears are rotatably arranged,
    wherein the shaft has a sun gear which interacts with the planet gears and rotor blades which are arranged on the planet disk,
    wherein rotor blade stages formed of further rotor blades are arranged fixedly on the rotor, and
    wherein the planet disk is sealed with respect to the shaft.

2. The rotor as claimed in claim 1, wherein at least four planet gears are arranged.

3. The rotor as claimed in claim 1, wherein the planet gears, the sun gear and the crown wheel are dimensioned such that a shaft rotational frequency of the shaft is higher than a planet disk rotational frequency of the planet disk.

4. The rotor as claimed in claim 1, wherein the planet disk is connected to a rotor disk.

5. The rotor as claimed in claim 4, wherein the rotor blades are arranged on the rotor disk.

6. A steam turbine having a rotor as claimed in claim 1.

7. The rotor as claimed in claim 1, further comprising a final stage of rotor blades comprising the rotor blades.

8. An apparatus, comprising:
    a rotor shaft;
    a first stage of a turbine comprising further rotor blades secured to the rotor shaft;
    a planetary gearset comprising: a crown wheel configured to be fixed against rotational movement relative to the rotor shaft; internal planet gears; a planet disk; and a sun gear secured to the rotor shaft; and
    a second stage of the turbine comprising rotor blades secured to the planet disk;
    wherein the planetary gearset is configured to cause the rotor blades to rotate about the rotor shaft at a different speed than do the further rotor blades.

9. The apparatus as claimed in claim 8, further comprising the turbine.

\* \* \* \* \*